United States Patent [19]
Azar et al.

[11] Patent Number: 5,799,071
[45] Date of Patent: Aug. 25, 1998

[54] TELECOMMUNICATIONS COST-MINIMIZING SYSTEM

[76] Inventors: Sanjar Azar, 15 Bluehill Dr., Westwood, Mass. 02090; Babak Azar, P.O. Box 224, Midland Park, N.J. 07432

[21] Appl. No.: 956,705

[22] Filed: Oct. 5, 1992

[51] Int. Cl.$^6$ .................................................. H04M 15/00
[52] U.S. Cl. ........................ 379/113; 379/130; 379/136; 379/140; 379/200
[58] Field of Search ........................ 379/199, 200, 379/201, 220, 221, 112, 113, 133, 136, 140, 130

[56] References Cited

U.S. PATENT DOCUMENTS

| | | | |
|---|---|---|---|
| 4,410,765 | 10/1983 | Jestad et al. | 379/112 |
| 4,585,904 | 4/1986 | Mincone et al. | 379/200 |
| 4,751,728 | 6/1988 | Treat | 379/113 |
| 4,757,267 | 7/1988 | Riskin | 379/113 |
| 5,086,456 | 2/1992 | Shizawa | 379/200 |
| 5,127,045 | 6/1992 | Cragun et al. | 379/88 |

*Primary Examiner*—Daniel S. Hunter

[57] ABSTRACT

The present invention features an automatic telecommunications system which includes a method for selecting the most economical carrier for the placement of a dialed telephone call. The telecommunications system attaches to a telephone number input device, such as a telephone dialer, a fax or computer/modem keyboard, a cellular phone, etc. The system captures the number dialed, while inhibiting or disconnecting the telephone from receiving incoming calls, thus preventing interruption of the data capture process. The captured number is fed to the user computer that accesses a first memory that has a database containing the carriers that provide service between the user service area and the area of the dialed number. The user computer contains an internal clock that ascertains the day of the week and the time of day. The computer is programmed to select a carrier providing the best (lowest) rate for the particular time of placement for the dialed call. The processor then appends the access code of the selected carrier to the dialed telephone number, and the number is fed into the telephone communication line for placement with the selected carrier. The telecommunications system accommodates multiple users and can communicate with the selected carrier via in-band or out-of-band signalling methods.

15 Claims, 3 Drawing Sheets

TELECOMMUNICATIONS COST-MINIMIZING SYSTEM

FILED OF THE INVENTION

The present invention pertains to an automated telecommunications system, which includes a method for determining the most economical telephone carrier when a telephone number is dialed via a telephone, a cellular telephone, a telefax keyboard, a computer/modem keyboard, etc., and, thereafter, automatically dialing the telephone number via that most economical carrier.

BACKGROUND OF THE INVENTION

Telecommunication systems of the type described by this invention are generally well known. These systems include devices that can reduce telephone charges when a caller places either an intrastate or interstate call. By way of example, a typical system of the type to which this invention refers is illustrated in U.S. Pat. No. 4,751,728, issued to John M. Treat. In this patented system, the user programs possible carriers and their associated rates into a computer from a standard touch-tone phone. Thereafter, the user enters the time, date, taxes and other information.

Upon selecting the telephone number to be dialed, the system then displays the rates of all of the carriers. This allows the user to select a carrier, so that the most economical carrier access code can be dialed by the user when keying in the telephone number from the telephone.

While the aforementioned system is a good one, the present invention features many advantages not contemplated or suggested in the prior patent description.

One of the drawbacks of the manual dialing system described in the abovementioned patent is the necessity of having to constantly program and manually update the system as carriers post new rates. This is an especially burdensome task, since, at the present time, rates are changed as frequently as approximately every three weeks.

Another drawback of the abovementioned system is the need for having to select and manually dial the access code of the particular carrier featuring the most economical rates for that particular call destination.

The present invention features an improved, automatic telecommunications system that will automatically determine from a telephone number therein entered, the carrier deemed most economical for handling the call. The inventive system thereafter automatically dials the number with the carrier access code appended thereto. The user is not required to program the system with carrier rates or geographical location (coordinates), since means are provided for automatically programming and updating the system database made available to the caller. The system keeps track of the length (duration), approximate cost, name of the city called, the chosen carrier and the dialed number of the placed call and provides a record thereof upon user demand. "Carrier" is used herein to represent local and long distance telephone and cable companies, as well as cellular phone networks and personal communications via satellites.

The invention uses an internal computer clock or other suitable electronic clock to ascertain the varying rates correlated to a specific day of the week and a particular hour of the day. In this way, the user is not required to furnish such information for determining the most economical carrier access code. The carrier access code is thus specified by the system on a fully automatic basis.

Also important, the database of the inventive system automatically supplies carrier rates. Carrier rates vary periodically as carriers change their rates; additionally, new carriers are added and old carriers deleted from the user's area. The database of the system (hereinbelow referred to as computer or user computer), of the inventive system is updated automatically over the telephone line (or other methods described herewithin) to which the user is connected. A main system computer provides the update to all of the user computers connected thereto.

In an alternate embodiment, updating of the user database can be accomplished by periodically mailing a memory card (preferably magnetic media) to each user as carriers servicing the user and rates are changed. The memory card is inserted in the user computer to add, delete or modify the number of carriers and their rates.

It will be obvious from the brief advantages described of the invention that a more versatile, convenient system is proposed herein. Furthermore, the invention is not limited to call placement from a telephone alone, as taught by the prior technology. Rather, the invention allows the user to place calls from a cellular phone, a fax, a computer/modem keyboard, a pen mouse (or a pen board computer without a keyboard) or a wireless system in which numbers can be entered without hardware connection, if so desired.

In order to achieve the objectives advanced above, the inventive system operates according to the following general procedures:

a) The system captures a telephone number being dialed from a telephone, entered into a keyboard of a fax or generated by a computer/modem;

b) The system then determines the rates of each carrier providing service between the caller's location and the telephone number destination;

c) The system then selects the most economical carrier for handling the call and automatically appends the access code of the selected carrier to the user-entered telephone number; and d) The system automatically places the call, with the required carrier information appended thereto.

SUMMARY OF THE INVENTION

In accordance with the present invention, there is provided an automatic telecommunications system which includes a method for selecting the most economical carrier for the placement of a dialed telephone call. The telecommunications system attaches to a telephone number input device, such as a telephone dialer, a fax or computer/modem keyboard, a cellular phone, etc. The system captures the number dialed, while disconnecting the telephone from receiving incoming calls. The disconnection prevents interruption of the data capture process.

The telecommunications system accommodates multiple users and can communicate with the selected carrier via in-band or out-of-band signalling methods. In the first method, the geographical location (vertical and horizontal coordinates) of the dialed telephone number are stored in the first memory and are periodically updated via the telephone line, computer diskettes or plug-in memory chips. In the second method, the information is obtained from on-line databases via high speed data links on a per call basis. Furthermore, the telecommunication system can be embodied in three forms: software-installed on a user's personal computer connected to a telephone line via a modem; software and plug-in PC board-installed on a user's personal computer connecting the telephone line to the computer; and stand-alone connects with the user's telephone system.

Account codes or project billing codes are also provided for, as a user option. Account codes are multi-digit numbers set up by carriers at the time of subscription to classify the telephone bill. For example, a law firm may assign a unique four-digit number to each of its clients. After dialing a number on behalf of a client, the carrier sends a tone indicating it is waiting for the four-digit account code and will not process the call without it. When the firm receives the bill at the end of the month, calls are grouped for each client and can easily be charged to their accounts. Other examples are account codes for each department within a corporation for managing the telecommmunications cost.

The captured number is fed to the user computer that accesses a first memory that has a database containing the carriers that provide service between the user service area and the area of the dialed number. The user computer contains an internal clock that provides the day of the week and the time of day. The computer is programmed to select a carrier providing the best (lowest) rate for the particular time of placement for the dialed call. The processor then appends the access code of the selected carrier to the dialed telephone number, and the number is fed into the telephone communication line, via software and modem, for placement with the selected carrier.

After the call is placed, the computer keeps track of the time elapsed for the call via its internal clock, and, upon termination thereof, feeds the information to a second memory, which provides record-keeping capabilities for the system. The record of the placed calls can be accessed by the user periodically. A display and/or printout device can be peripherally attached to the user computer in order to provide the user with information regarding the calls that have been placed, the carriers, their elapsed time and their cost.

In one embodiment of the invention, a user computer is periodically updated with carrier and rate change information via the telephone line, which connects to a master computer CCS7, POTS or ISDN database servicing the user computers or stand-alone systems in a given service area.

In another embodiment of the invention, the user is periodically mailed an update memory card containing the latest carrier and rate information. The user inserts the memory card into the user computer for updating the database.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features an automatic system for determining and selecting the least expensive carrier for a dialed telephone call. The system contains a microprocessor and associated software (system) that is programmed for processing the dialed number. An internal computer clock provides the day and time of the dialed call. A first computer memory contains carrier, geographical and rate data corresponding to the time and destination of the call. The system selects the most economical carrier for placement of the call and automatically appends the carrier access code to the dialed number via a dial generator. A routing switch then feeds the information into the telephone line and the call is initiated.

Figure 1:
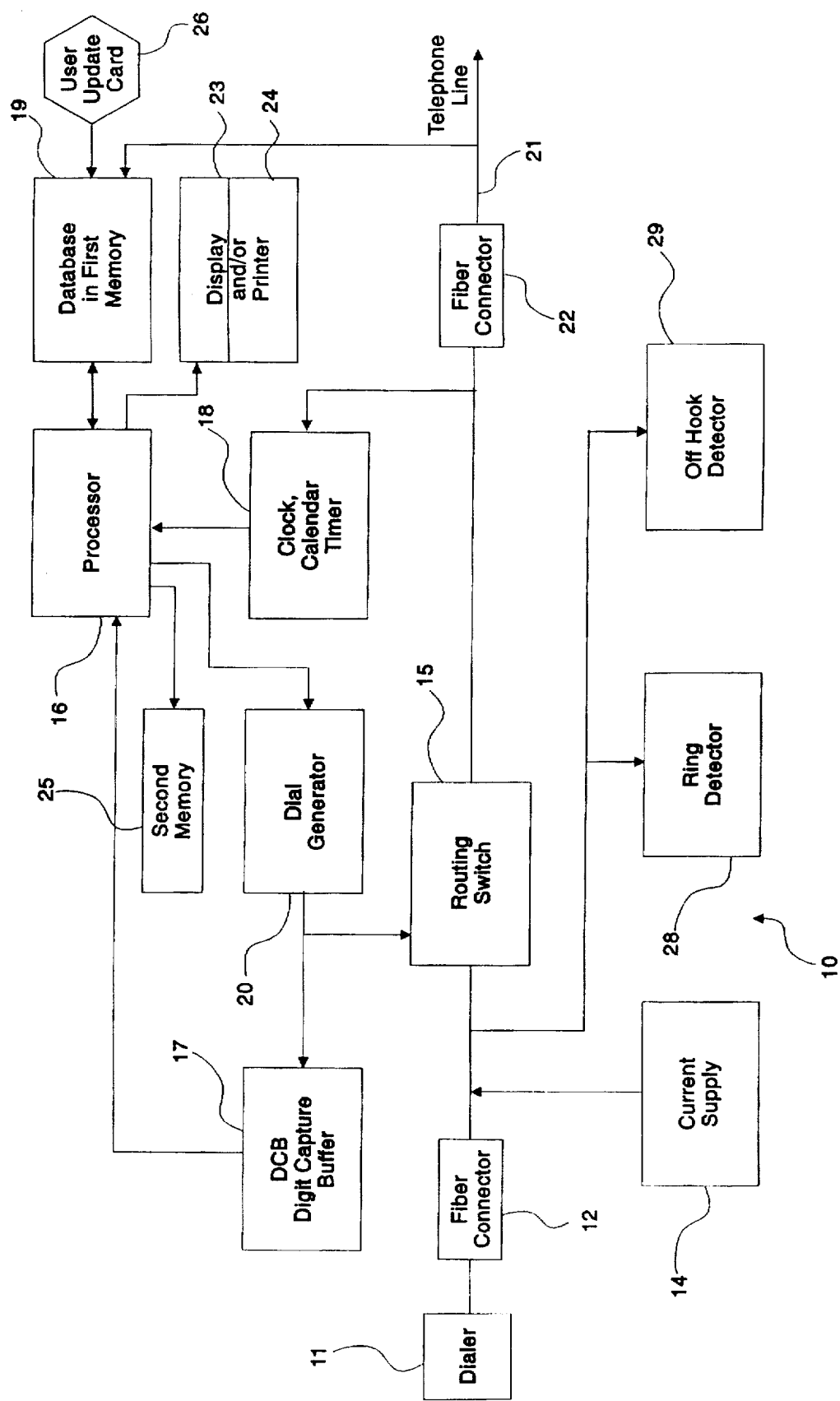
FIG. 1 illustrates a schematic block diagram of the system of the invention.

Now referring to FIG. 1, there is shown a schematic diagram of the automatic carrier selection and dialing system 10 of this invention. A telephone number is first dialed into the system via a dialer 11. The dialer 11 can be a regular touch-tone telephone, a cellular telephone or a keyboard of a fax machine, computer/modem, etc. Conventional features, such as speed or memory dialing, on-screen telephone and address book, project codes/departments and the like are all compatible with the inventive system. Moreover, the system can be easily adapted to be used with multi-set and PBX systems, Telco interface areas with CCS7, ISDN and multi-line (DS-1, DS-3) digital carriers.

The dialer 11 attaches to the inventive system via an appropriate jack 12. The system 10 has its own power supply 14 for providing the necessary operating current during digit capture and processing. The system 10 is also connected to the telephone line 21 via an appropriate jack 22.

The dialed telephone number is then fed through a routing switch 15 that feeds the dialed information to a processor 16 via a digit capture buffer 17. The digit capture buffer 17 may be incorporated in a separate printed circuit board, which can be added to an existing telephone system by appropriate means. In this way, existing telephone systems may be retrofitted with the digit capture buffer feature.

The processor 16 is programmed to recognize the first three digits representing the area code of the dialed call. The processor 16 then accesses a first memory 19, which can be a hard disk, random access memory, magnetic tape, diskette or any other form of memory storage. First memory 19 contains a database of all of the carriers (e.g., AT&T, MCI, Sprint, etc.) providing service between the user's area code and the dialed telephone area code. This procedure is described in greater detail with respect to FIGS. 2 and 3 hereinbelow.

The program routine determines the lowest telephone rate of the accessed carriers in accordance with the internal clock 18, which provides time and day information of when the call is being placed. The processor 16 then appends the corresponding carrier access code to the telephone number and feeds this information to a dial generator 20, which dials the appropriate access carrier and telephone number. The dialed, appended number is fed to the telephone line 21 via the routing switch 15. In this fashion, the user receives the most economical rate for placement of the telephone call.

The processor program keeps track of the duration of the telephone call via the internal clock 18. The time and cost of the call, plus rate and carrier information, are displayed on the computer screen 23. An optional printer 24 can provide a printout of each telephone call and/or can be accessed periodically to provide daily, weekly or monthly reports. Each telephone call is stored in a second memory unit 25, which can be accessed by keying the appropriate designation on the telephone dialer or keyboard 11 (such as ##5 for each call dialed or, as another example, ##7 for a monthly printout).

The carriers and their corresponding rates can be programmed into the system 10 by means of a user memory card 26 containing the carriers that service the user area code. The memory card 26 is inserted into a slot (not shown) in the processor 16, and the appropriate code is dialed on the telephone dialer or keyboard 11 to initiate a data capture program routine. Such a data capture code may be, for example, **3. Periodically, a new memory card 26 can be mailed to each system user in the system area code. The new memory card 26 will contain information with respect to new carriers providing service and/or old carriers that are no longer providing service and/or updated carrier rates for each carrier.

The database of the first memory 19 of system 10 may also be updated via any physical connection medium, such as analog/digital transmission over copper wire, analog/digital microwave radio, fiber optics, etc. When using telephone line 21 for updating the database carrier and rate information an appropriate data capture code can be keyed in on the dialer 11, such as **2. This data capture command initiates a data capture program, which instructs the dial generator 20 to dial a special access code and user identity number to a main system computer (not shown) located at a central station. When access is granted, the main system computer establishes a communications channel with the user processor 16. Thereafter, the main computer will download any information modifications into the first memory 19.

The telecommunications system accommodates multiple users and can communicate with the selected carrier via in-band or out-of-band signalling methods. In the first method, the geographical location (vertical and horizontal coordinates) of the dialed telephone number are stored in the first memory and are periodically updated via the telephone line, computer diskettes or plug-in memory chips. In the second method, the information is obtained from on-line databases via high speed data links on a per call basis. Furthermore, the telecommunication system can be embodied in three forms: software, which is loaded on, and executable by a user's personal computer connected to a telephone line via a modem; software and plug-in PC board, which are installed on a user's personal computer connecting the telephone line to the computer; and stand-alone, which connects with the user's telephone system, independent of a PC.

The updating procedure may be handled by system 10 periodically and automatically. When such a process is implemented, the processor 16 has a routine for requesting the generation of access codes to the main computer. An on-line, CCS7, POTS or ISDN database, such as an information bulletin board, not shown, may be accessed and the data therein downloaded to the user's system 10. The internal clock 18 triggers the processor to invoke the appropriate routine at given time intervals.

The ring detector 28 is operatively connected to the system 10 via the routing switch 15 and provides means to inform the processor 16 that an incoming call is in process. This ring detector 28 provides means by which the dialing process can be terminated, as will be explained hereinafter with respect to FIG. 2.

An "off the hook" detector 29, also connected to routing switch 15, determines whether the handset (not shown) is lifted, either to initiate a call or to respond to an incoming call. An automatic dialing termination mode can be invoked for purposes of responding to an incoming call.

Figure 2:
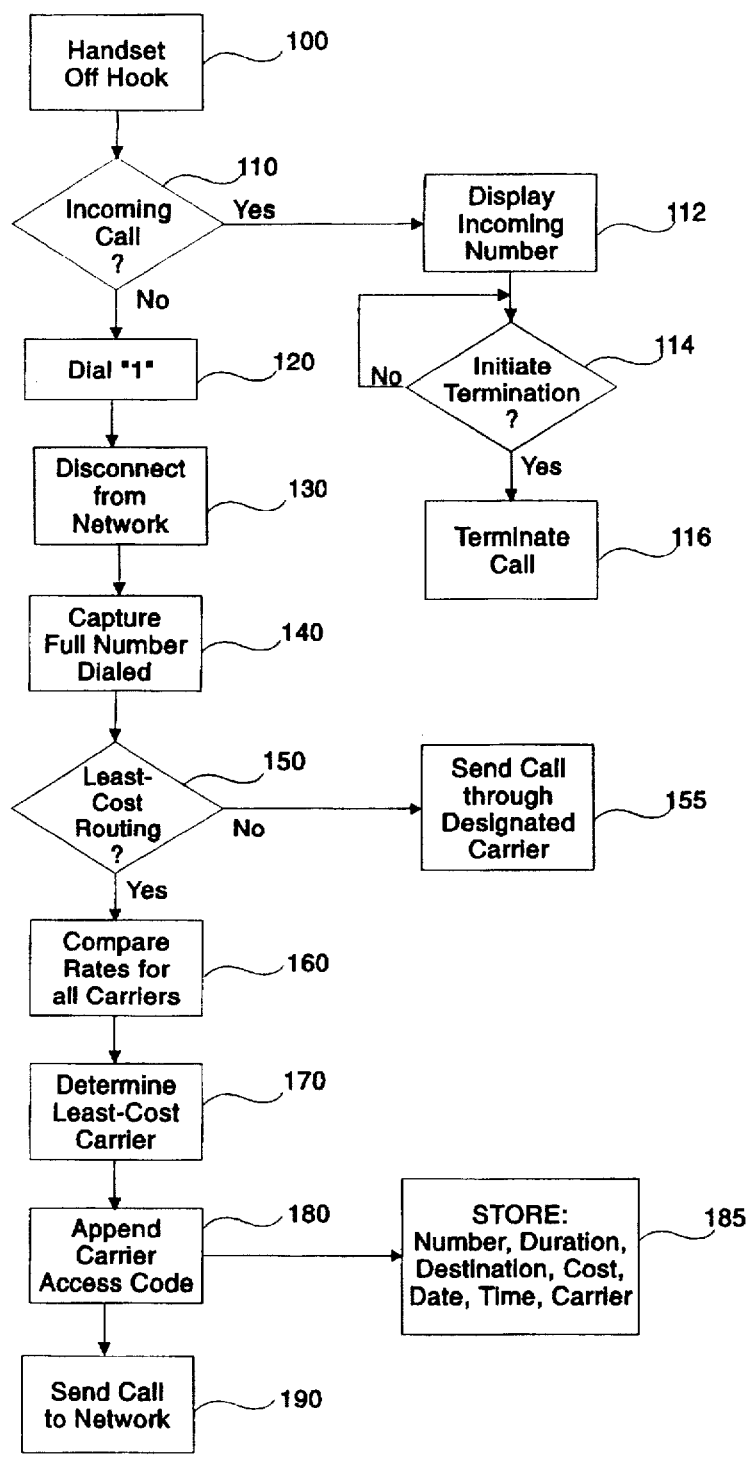
FIG. 2 depicts a flow diagram of the processing program for the automatic selection of a carrier for a dialed telephone number.

Referring to FIG. 2, there is shown a flow chart of the program residing in processor 16 (FIG. 1) of system 10. The processor 16 is programmed to operate automatically in a digit capture mode, when the telephone handset of the dialer 11 is lifted. The system 10 monitors the handset to determine whether the handset of the dialer 11 is off the hook, step 100. If the handset was removed, but not as a result of responding to an incoming call, step 110, the usual "1" before each telephone number is dialed by the system 10, step 120.

When entering the digit capture mode, the processor 16 inhibits (disconnects) system 10 from receiving incoming calls from the telephone line 21, step 130. Thereafter, the processor 16 is programmed to receive the full telephone number, as described hereinafter.

If an incoming call is received on line 21, step 110, at any time after the handset has been removed from the dialer 11 but before the actual sending of the call, the processor 16 displays the incoming caller number, step 112, if the user has subscribed to a caller-identity service from the local carrier. If the user has not subscribed to a caller-identity service, the display screen 23 (FIG. 1) displays only an "incoming call" message. Upon receiving this message, the processor 16 can automatically terminate the dialing procedure, steps 140 through 190, if in automatic termination mode. Alternatively, the user can initiate termination, step 114, by dialing an appropriate code, such as *#, via dialer 11. The digit capture process is then routed to a terminate subroutine, step 116.

The digit capture process can be resumed. The telephone number is then captured and processed, step 140. After the least costly carrier determination process is initiated (as described in further detail with respect to FIG. 3, hereinbelow), the user can be provided with a choice of staying with the present carrier, step 150, thereby effectively disabling the cos t-minimizing system. The original designated carrier can be selected, step 155, by programming the system to be in "local carrier mode".

If the system is not in "local carrier mode", a rate comparing step 160 is performed. Thereafter, the least cost carrier is determined, step 170, and the appropriate carrier code is appended to the telephone number, step 180. The appending subroutine also initiates the store sequence 185, wherein the time, date, carrier, destination, and call number and duration are stored in the second memory 25 (FIG. 1).

The telephone number and appended carrier access code are then generated and sent along the telephone line, step 190.

Figure 3:
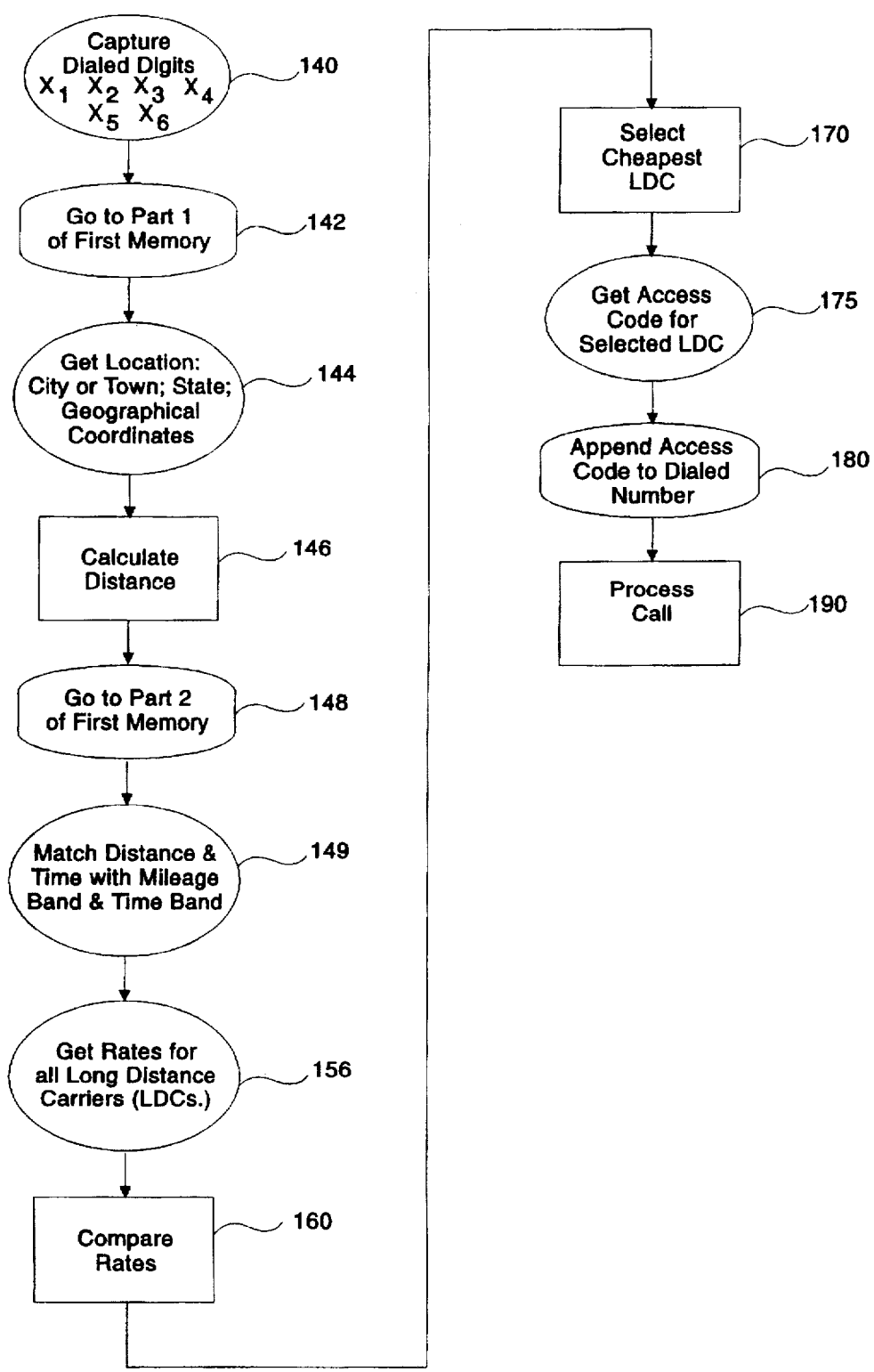
FIG. 3 depicts a flow diagram of a portion of the processing program of FIG. 2, but in greater detail.

Referring now to FIG. 3, there is shown a flow diagram of a portion of the processing program of FIG. 2. Specifically, the process described in steps 140 through 190 (FIG. 2) is shown in greater detail.

First memory 19 (FIG. 1) contains two parts. Part 1 of first memory 19 includes data representative of geographical coordinates of all the switching centers in the United States and its territories that provide service to a called number. It should be understood that this data need not be stored in the form of geographical coordinates, but may be in the form of mileage and/or mileage bands. A typical entry in Part 1 of memory 19 is as follows:

NYXNXXytown'ystateOrizontalCoord.[Ve]rticalCoord.

The first three digits (NYX) in the first field represent the area code; and the second three digits (NXX) represent the telephone exchange of a typical seven-digit phone number. This composite number (NYXNXX) is associated with the name of the city and state servicing phone numbers starting with this numeric sequence. The horizontal and vertical coordinates pinpoint the geographical location of the switching center. The coordinates are used by the system 10 to calculate the distance between the origination party and the called party. Alternatively, the system may be dynamically operated, so that control begins at the first line of an appropriate area code in the first memory 19 and progresses to the telephone exchange therein, at which is stored the corresponding mileage band number.

Part 2 of the first memory 19 (FIG. 1) resides on the same memory medium as does Part 1 of first memory 19. Part 2 contains data representative of valid carriers, access codes, mileage band structure, time tables and associated rate information. A typical entry in Part 2 of first memory 19 is as follows:

LDC⁻eaCode͵cessCode[leageBand[Ti]meBandte

LDC is the name of the long distance carrier. As used herein, LDC may represent either a local or a long distance communication company. Area code is a three-digit number of any area code serviced by the carrier. Access number is the sequence of digits used by the telephone companies to route the call through a carrier's network. Mileage band provides an upper and lower range of mileage assigned a specific rate. Time provides an upper and lower range of the time of day in which a call is placed. Rate is the cost per minute for a call that matches the mileage band and time entries in first memory 19. In operation, after the digits of the dialed number are captured, step 140 (FIG. 3), the system 10 searches Part 1 of the first memory 19, step 142, until a stored area code is located and favorably compared to the first three digits (NYX) of the dialed number. The location (town and state) and geographical coordinates are then extracted from memory 19, step 144. From the coordinates, the system 10 determines the distance between the origination point and the called destination, step 146. This determination is performed by calculation in the preferred embodiment, but it should be understood that a look-up table can also be provided, especially for commonly-us ed distances.

At this point, the system 10 accesses Part 2 of first memory 19, step 148. The distance and time of day that the call is dialed are compared to the mileage band and time band ranges stored in first memory 19, step 149. From this information, the system 10 determines the rate for all LDCs and other carriers that serve the called location, step 156. The rates of all the available carriers are then compared, step 160, to determine the least expensive carrier for the call, step 170.

The access code for the selected carrier is then retrieved from first memory 19, step 175, and is appended to the dialed number, step 180. The call can then be processed, step 190.

In an alternative embodiment, the aforementioned invention can be implemented in software with a modem used to facilitate signal transmission. The features outlined herein, except for the hardware connection, are all an integral part of the software/modem combination. In this case, the inventive process is captured in a software/modem combination having features such as: credit card calling, on-line calling and calling from a database (e.g., a phone book); call costing, record keeping and call accounting; speed dialing and memo-taking capability; printing phone bill records and sorting the phone bill by carrier, cost, time, date, destination (e.g., state), project code, etc.; operator-assisted calls; information and emergency and operator quick dialing; project-based record keeping; and software adapted to operate in DOS, PS/2, Windows and Apple environments.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. Having thus described the invention, what is desired to be protected by Letters Patent is presented in the subsequently appended claims.

What is claimed is:

1. A telecommunications cost-minimizing system having means for receiving a telephone number from at least one of a plurality of users at a point of origin, said system having means for storing carrier rates for a plurality of telecommunications carriers and corresponding access codes for each of said plurality of telecommunications carriers, comprising:

a) dialing means for capturing a telephone number dialed at the point of origin;

b) a processor operatively connected to said dialing means for processing said captured telephone number, said processor having a telephone number generating program, said processor comprising:
      i) first memory for storing the access codes of a plurality of telecommunications carriers providing service between said point of origin and a destination corresponding to said dialed telephone number;
      ii) access means operatively connected to said first memory means for accessing access codes of said plurality of telecommunications carriers; and
      iii) comparing means operatively connected to said first memory for determining least costly rates of said plurality of telecommunications carriers providing service between said point of origin and said destination;

c) telephone number generating means operatively connected to said processor for appending an access code to said captured telephone number, said appended access code corresponding to a least costly telecommunications carrier;

d) routing means operatively connected to said telephone number generating means for routing said telephone number with appended access code to a telecommunications line or system with both in-band and out-of-band signalling methods; and e) means operatively connected to said routing means for detecting an incoming call, wherein a dialed number can be interrupted during operator input dialing of the number to answer an incoming call.

2. The telecommunications cost-minimizing system in accordance with claim 1, wherein said first memory further comprises means for storing the geographical location of the dialed number.

3. The telecommunications cost-minimizing system in accordance with claim 1, wherein said first memory is operatively connected to updating means for updating said stored telecommunication carrier rates, for deleting old carriers and for receiving new access codes for new carriers.

4. The telecommunications cost-minimizing system in accordance with claim 2, wherein said first memory is operatively connected to updating means for updating, for storing and for deleting vertical and horizontal coordinates of said geographical location.

5. The telecommunications cost-minimizing system in accordance with claim 2, wherein said first memory is operatively connected to updating means for updating, for storing and for deleting data representative of global positions of telephone transmitters and receivers used for personal communications.

6. The telecommunications cost-minimizing system in accordance with claim 1, wherein said processor has an internal clock for determining the day and time-of-day at which said telephone number is captured and is operative with said access means to determine said least costly rates for said plurality of telecommunications carriers.

7. The telecommunications cost-minimizing system in accordance with claim 1, further comprising a second memory operatively connected to said processor for storing telephone call duration information.

8. The telecommunications cost-minimizing system in accordance with claim 1, wherein said dialing means further comprises a digit capture buffer board.

9. The telecommunications cost-minimizing system in accordance with claim 8, wherein said digit capture buffer board monitors when the telephone handset is functionally off the hook or disconnected from said dialing means.

10. The telecommunications cost-minimizing system in accordance with claim 8, wherein said digit capture buffer board detects hang-ups of said dialing means and of the call receiver.

11. The telecommunications cost-minimizing system in accordance with claim 8, wherein said digit capture buffer board captures said dialed telephone number.

12. The telecommunications cost-minimizing system in accordance with claim 1, further comprising display means operatively connected to said processor for displaying at least one of the following:

a) telephone carrier rate information;
b) telephone call duration information; and
c) incoming call information.

13. The telecommunications cost-minimizing system in accordance with claim 1, further comprising printing means operatively connected to said processor for providing electronic storage and display of the telephone bill and a printout of completed telephone calls.

14. The telecommunications cost-minimizing system in accordance with claim 1, wherein said dialing means is seelected from a group of dialing mechanisms consisting of a touch-tone telephone, a fax keyboard, a computer/modem keyboard, a wireless telephone or computer, a cellular telephone, and an infrared or ultrasound dialer.

15. The telecommunications cost-minimizing system in accordance with claim 14, further comprising a stand-alone device for receiving said dialed telephone number and for determining least cost routing, whereby said stand-alone device appends said access code to said telephone number and retransmits said appended telephone number to said processor for subsequent processing of the call through said least costly telecommunications carrier.

* * * * *